US008807810B2

(12) United States Patent
Sato et al.

(10) Patent No.: US 8,807,810 B2
(45) Date of Patent: Aug. 19, 2014

(54) THREE-DIMENSIONAL INFORMATION PRESENTATION DEVICE

(75) Inventors: Jun Sato, Nagoya (JP); Fumihiko Sakaue, Pittsburgh, PA (US); Masahiko Inagaki, Kariya (JP)

(73) Assignee: National University Corporation Nagoya Institute of Technology, Nagoya (JP)

( * ) Notice: Subject to any disclaimer, the term of this patent is extended or adjusted under 35 U.S.C. 154(b) by 206 days.

(21) Appl. No.: 13/376,004

(22) PCT Filed: Jun. 7, 2010

(86) PCT No.: PCT/JP2010/059599
§ 371 (c)(1),
(2), (4) Date: Dec. 2, 2011

(87) PCT Pub. No.: WO2010/143600
PCT Pub. Date: Dec. 16, 2010

(65) Prior Publication Data
US 2012/0075878 A1    Mar. 29, 2012

(30) Foreign Application Priority Data

Jun. 8, 2009  (JP) .................................. 2009-137269

(51) Int. Cl.
*F21V 21/00* (2006.01)
*B60Q 1/02* (2006.01)
(52) U.S. Cl.
USPC ............... 362/538; 362/543; 362/231; 353/7; 353/10

(58) Field of Classification Search
USPC ............ 362/543, 538, 231, 249.01, 459, 234, 362/253; 353/7, 10, 13, 94
See application file for complete search history.

(56) References Cited

U.S. PATENT DOCUMENTS

| 4,724,480 | A | * | 2/1988 | Hecker et al. ................. 348/95 |
| 4,914,460 | A | * | 4/1990 | Caimi et al. .................. 396/28 |
| 6,601,980 | B2 | | 8/2003 | Kobayashi et al. |
| 7,916,278 | B2 | * | 3/2011 | Smith ......................... 356/4.01 |

(Continued)

FOREIGN PATENT DOCUMENTS

| JP | A-7-137574 | 5/1995 |
| JP | A-2001-229717 | 8/2001 |

(Continued)

OTHER PUBLICATIONS

Jul. 6, 2010 International Search Report issued in International Application No. PCT/JP2010/059599 (with Translation).

(Continued)

*Primary Examiner* — Bao Q Truong
(74) *Attorney, Agent, or Firm* — Oliff PLC

(57) ABSTRACT

Three-dimensional information is presented directly on the surface of a target three-dimensional object without using a display device such as a display monitor and an HUD. Spatially coded light patterns are projected from two projectors on a target object surface. The light projected from the two projectors are added up on the object surface to produce unified color and luminance. On the object surface, light is simply added up, so that a pattern whose color and brightness correspond to distance and height appears. Hence, a distance to an object or a three-dimensional shape of an object can be highlighted by the color and brightness presented on the object for perception by human beings.

15 Claims, 15 Drawing Sheets

(56) References Cited

U.S. PATENT DOCUMENTS

| | | | | |
|---|---|---|---|---|
| 7,944,549 | B2* | 5/2011 | Oron et al. | 356/28 |
| 8,094,322 | B2* | 1/2012 | Mayer et al. | 356/602 |
| 2006/0033890 | A1* | 2/2006 | Hasegawa | 353/94 |
| 2006/0192925 | A1* | 8/2006 | Chang | 353/94 |
| 2008/0273190 | A1 | 11/2008 | Smith | |

FOREIGN PATENT DOCUMENTS

| | | |
|---|---|---|
| JP | A-2003-166804 | 6/2003 |
| JP | A-2005-075190 | 3/2005 |
| JP | A-2007-182151 | 7/2007 |
| JP | A-2007-235529 | 9/2007 |
| JP | A-2008-275380 | 11/2008 |
| WO | WO 2006/028512 A2 | 3/2006 |

OTHER PUBLICATIONS

Jun Sato, "Multiple View Geometry for Projector Camera Systems and Its Applications," Transactions of Information Processing Society of Japan IPSJ, Mar. 2008, vol. 49, No. SIG6, pp. 56 to 67 (with Abstract).

Srinivasa G. Narasimhan et al., "Temporal Dithering of Illumination for Fast Active Vision," Proc. ECCV #2008, pp. 830-844, 2008.

Thomas P. Koninckx et al., "A Graph Cut based Adaptive Structured Light approach for real-time Range Acquisition," Proc. 3DPVT, pp. 1-9, 2004.

Tomonori Haruta et al., "3-Dimensional Shape Measurement from Projection of Time-Space Coded Pattern," IPSJ SIG Computers and the Humanities Symposium, Dec. 14, 2001, vol. 2001, No. 18, pp. 149 to 155 (with Abstract).

Chen. C. et al., "Range data acquisition using color structured lighting and stereo vision," *Image and Vision Computing*, 1997, pp. 445-456, vol. 15.

Kagami S., "Range-Finding Projectors: Visualizing Range Information without Sensors," *IEEE International Symposium on Mixed and Augmented Reality 2010 Science and Technology Proceedings*, Oct. 13-16, 2010, pp. 239-240.

Sakaue, F. et al., Surface Depth Computation and Representation from Multiple Coded Projector Light, *IEEE 2011 IEEE Computer Society Conference on Computer Vision and Pattern Recognition Workshops (CVPRW)*, Jun. 20, 2011, pp. 68-73.

Nishida, S. et al., "Development of an Optical Ruler for Range Finding Using a Binary Fresnel Hologram," *IQEC/CLEO Pacific Rim 2011*, Aug. 28-Sep. 1, 2011, pp. 1336-1338.

Extended European Search Report issued in European Patent Application No. 10786131.2 on Mar. 21, 2013.

International Preliminary Report on Patentability issued in International Application No. PCT/JP2010/059599 dated Jan. 26, 2012.

Office Action dated Apr. 1, 2014 issued in Japanese Patent Application No. 2011-518524 (with translation).

* cited by examiner (a) PROJECTION PATTERN OF 1st PROJECTOR (b) PROJECTION PATTERN OF 2nd PROJECTOR (a)　　　　　　　　　(b)

(c) γ

(b) β

(a) α

THREE-DIMENSIONAL INFORMATION PRESENTATION DEVICE

TECHNICAL FIELD

The present invention relates to a three-dimensional information presentation device for presenting three-dimensional information. The present invention makes it possible, for example, during traveling of a vehicle, to support the driver of the vehicle by coloring a road surface according to heights of irregularities of the road surface or by coloring an obstacle forward of the vehicle.

BACKGROUND ART

Many techniques for three-dimensional measurement to be made using projectors and a camera have been proposed (see non-patent literature 1 and 2, for example). According to such techniques, projector light is coded in some way or another; projected light is received by a camera; correspondence is established, making use of coding, between points on the projector images and points on the camera image; and three-dimensional distances are measured based on the theory of triangulation. Three-dimensional information obtained by measurement is presented to users, for example, by displaying the information on a display device (see patent literature 1 and 2) or by presenting the information on a windshield using a head-up display (HUD) (see patent literature 3).

CITATION LIST

Patent Literature

[PTL 1]
Japanese Patent Application Publication No. 2008-275380
[PTL 2]
Japanese Patent Application Publication No. 2007-235529
[PTL 3]
Japanese Patent Application Publication No. 2005-75190

Non-Patent Literature

[NPTL 1]
S. G. Narasimhan, S. J. Koppal, S. Yamazaki, Temporal Dithering of Illumination for Fast Active Vision, Proc. ECCV2008, pp. 830-844, 2008.
[NPTL 2]
T. Konincks, I. Geys, T. Jaeggli, L. V. Gool, A graph cut based adaptive structures light approach for real-time range acquisition, Proc. 3DPVT, 2004.

SUMMARY OF INVENTION

Technical Problem

Prior-art techniques for three-dimensional measurement to be made using projectors, among which the techniques disclosed in non-patent literature 1 and 2 are typical ones, are aimed at, as their final purpose, restoring three-dimensional information, and how to present the three-dimensional information to users has been considered a separate task. In this regard, according to prior-art techniques for information presentation with the techniques disclosed in patent literature 1 and 2 being typical ones, three-dimensional information obtained is presented using information presentation devices such as display monitors. To grasp three-dimensional information presented, therefore, the user has to look at a display monitor turning his or her eyes away from the real three-dimensional scene. This results, when the user is driving a vehicle, in inattentive driving, i.e. behavior undesirable from the standpoint of safety. In the case of the technology disclosed in patent literature 3, distance information is presented by displaying a virtual object on a spot, corresponding to the position of the real object, on the windshield of a vehicle. In this case, sharply displaying a virtual object on a windshield is difficult, besides the driver is required to shift focusing between a real object and a corresponding object displayed on the windshield which are largely apart. This poses a problem about safety. Furthermore, to present accurate information about the position of a real object, it is necessary to accurately measure the driver's viewpoint position. In reality, however, the driver's viewpoint position cannot be accurately measured. It, therefore, occurs that a real object and a corresponding object displayed do not accurately correspond positionally. There is also a method in which information is presented using a head-mounted display (HMD). While this method has the same problems as the method in which an HUD is used, it is difficult to mount an HMD at the head of a driver driving a vehicle. All these problems are caused because information is indirectly presented using a display device such as a display monitor, HUD, or HMD.

In light of the foregoing, it is an object of the present invention to present three-dimensional information directly on the surface of a target three-dimensional object without using a display device such as a display monitor or HUD.

Solution to Problem

In order to achieve the above-described object, the present inventors have conducted the following study. Specially coded light patterns are projected on an object surface from two or more projectors installed in different locations. The light patterns may be coded according to color or luminance. The light projected from two projectors at different locations is merged on the object surface to produce unified color and brightness. The light patterns can be coded so as to change the color and brightness produced on the object surface according to distances from the projectors. This is because, by the same theory as that of triangulation performed using two cameras, the location where the light projected from the two projectors overlap changes according to the distances of the object from the projectors. This causes a pattern of color and brightness corresponding to distances or heights to appear on the object surface, enabling highlighted presentation, by means of the color and brightness represented on the object surface, of such information as the distance to or three-dimensional shape of the object for perception by human beings. The manner in which the color and brightness change according to distances can be adjusted by means of light pattern coding.

The present invention has been made based on the above study and has the following characteristics.

Namely, the present invention provides a three-dimensional information presentation device including a plurality of light projecting means for projecting light to a same spatial region. In the three-dimensional information presentation device, light patterns projected from the plurality of light projecting means are spatially coded so as to present three-dimensional information about a projected surface.

Expression "light patterns are spatially coded" used in describing the present invention means "light patterns are set

DESCRIPTION OF EMBODIMENTS

First Embodiment

Figure 1:
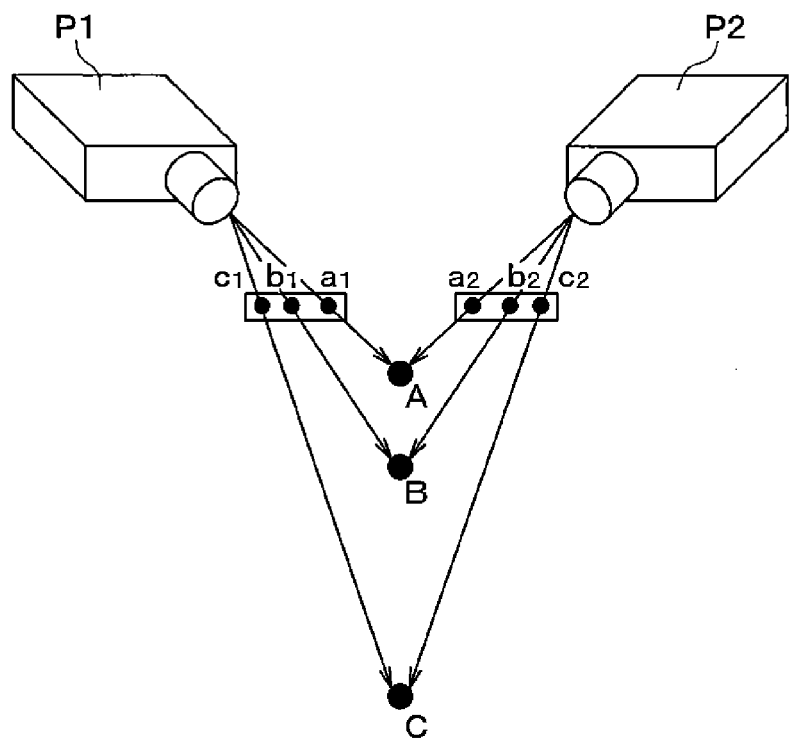
FIG. 1 is a diagram showing a configuration of a three-dimensional information presentation device according to a first embodiment of the present invention.

FIG. 1 shows a configuration of a three-dimensional information presentation device according to a first embodiment of the present invention. In the three-dimensional information presentation device, two projectors P1 and P2 project light, as shown in FIG. 1, on a target object surface. The light projected from the two projectors P1 and P2 is merged on the object surface to produce a single color and luminance. Light projected on an object surface is simply added up. Therefore, referring to FIG. 1, the color and luminance of point A on the object surface are the results of adding the color and luminance of point $a_1$ on the image surface of the first projector P1 and the color and luminance of point $a_2$ on the image surface of the second projector P2. Similarly, the color and luminance of point 13 on the object surface are the results of adding the colors and luminance of points $b_1$ and $b_2$, and the color and luminance of point C on the object surface are the results of adding the colors and luminance of points $c_1$ and $c_2$.

Figure 2:
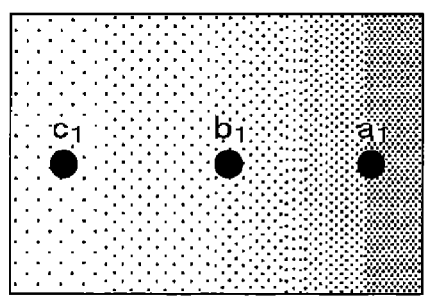
FIG. 2 is a diagram showing projection patterns of the two projectors shown in FIG. 1.
Figure 2:
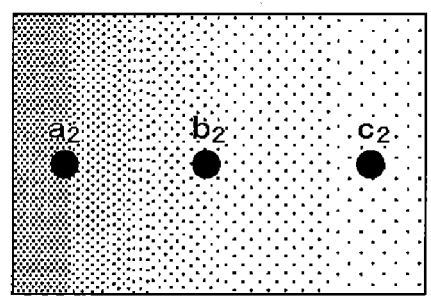

The gradation patterns of the light projected from the two projectors P1 and P2 are made to be opposite to each other, as shown in FIG. 2, by spatial coding so that the gray level changes oppositely between the two gradation patterns. The gray level changes linearly along the direction in which the two projectors P1 and P2 are arranged or, to be more specific, along the linear direction in which the projection centers of the two projectors P1 and P2 can be connected. In this arrangement, the luminance of point A being the result of adding the black of point $a_1$ and the black of point $a_2$ is black. Also, the luminance of point B being the result of adding the gray of point $b_1$ and the gray of point $b_2$ is gray, and the luminance of point C being the result of adding the white of point $c_1$ and the white of point $c_2$ is white. Since the luminance of light projected from the two projectors P1 and P2 changes linearly, all the points at the same distance as point A are as black as point A, all the points at the same distance as point B are as gray as point B, and all the points at the same distance as point C are as white as point C. Hence, the luminance produced on the object surface visualizes the three-dimensional distances of different points on the object surface.

Figure 3:
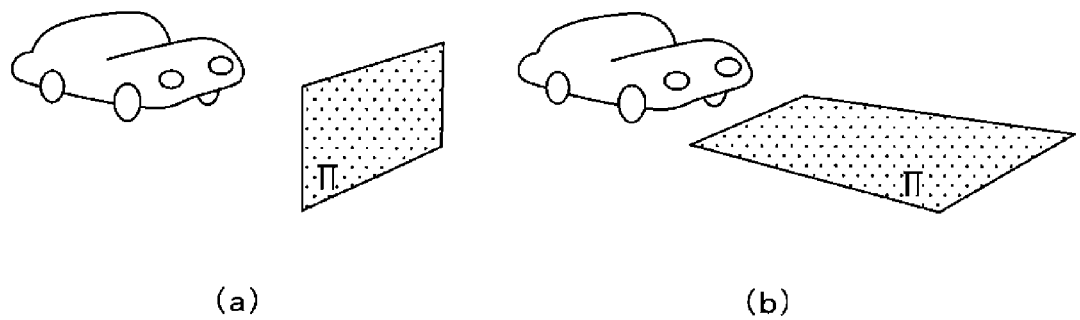
FIG. 3 is a diagram for explaining reference plane setting in a case where the three-dimensional information presentation device shown in FIG. 1 is applied to a vehicle.

The three dimensional distances to be visualized can be made distances perpendicular to a reference plane Π arbitrarily set in three-dimensional space. When, for example, the three-dimensional information presentation device is applied to a vehicle as vehicle-mounted projectors to visualize the distance to a forward vehicle or obstacle, a plane perpendicular to the direction of vehicle travel is made a reference plane Π as shown in FIG. 3(a). Or, to visualize road surface irregularities, the road surface may be made a reference plane H as shown in FIG. 3(b) so as to visualize differences in height perpendicular to the road surface.

Figure 4:
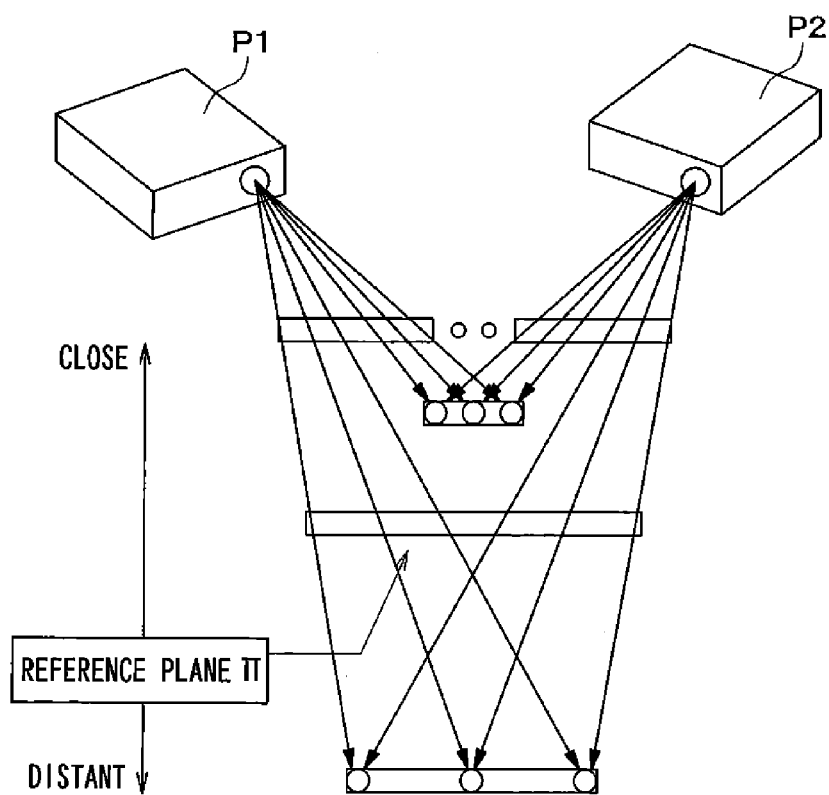
FIG. 4 is a diagram for explaining distance measurement based on a reference plane.
Figure 5:
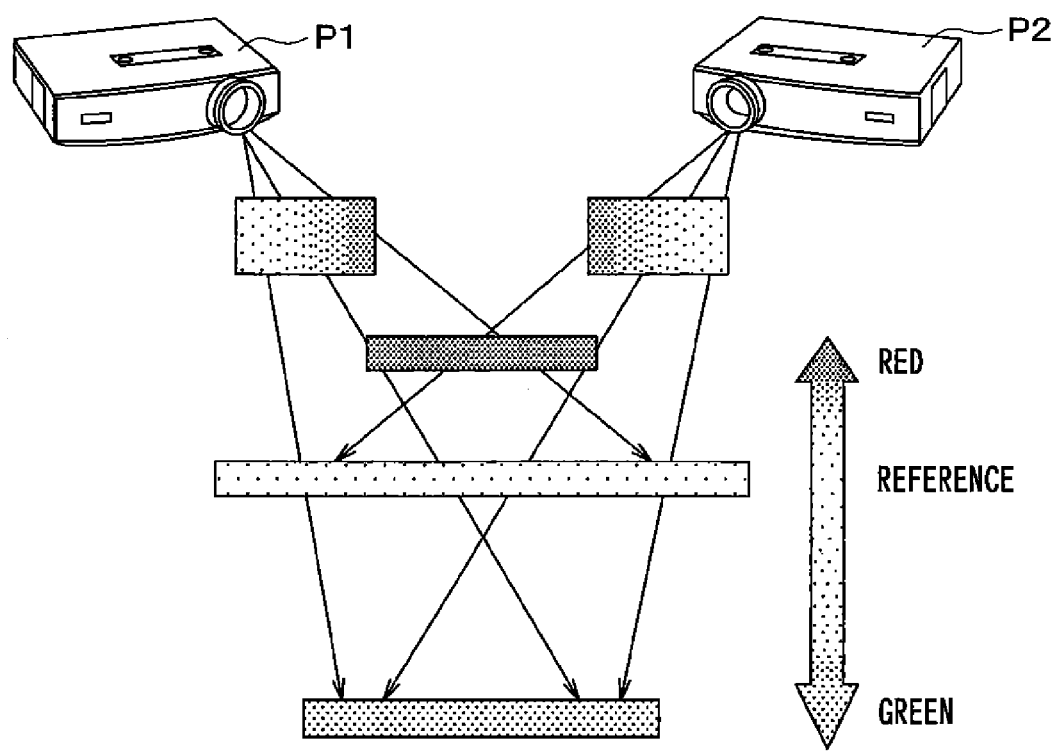
FIG. 5 is a diagram for explaining color change in a case where color gradations are projected.
Figure 6:
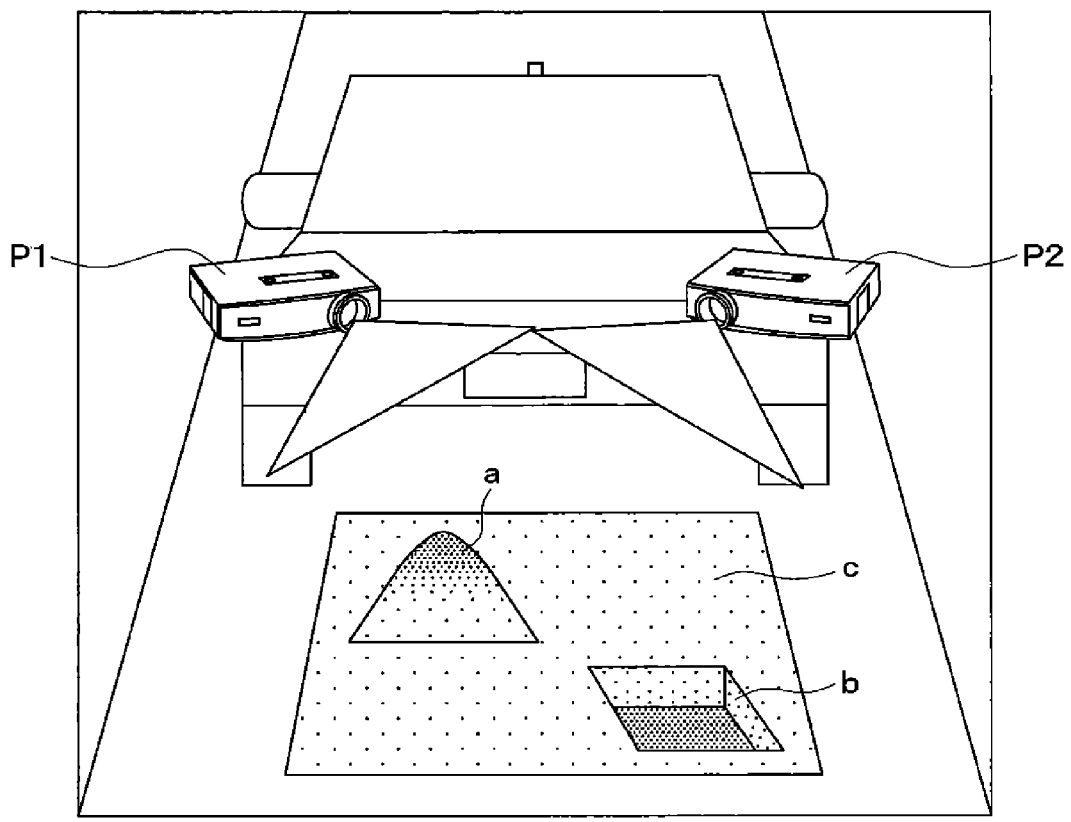
FIG. 6 is a diagram for explaining highlighted presentation of a road surface profile by vehicle-mounted projectors.

When, with white-to-black grayscale gradation images as shown in FIG. 2 projected, the distance from the reference plane Π changes as shown in FIG. 4, the pixel values added up change causing the luminance values observed to change. This enables highlighted presentation, based on observed luminance, of distances from the reference plane Π. In cases where, unlike white-to-black grayscale gradation images, red-to-green color gradation images as shown in FIG. 5 (gradation of red to yellow to green different from gradation of white to gray to black shown in FIG. 2) are projected, the luminance of an object far from the projectors is observed as green whereas the luminance of an object near the projectors is observed as red. When, to visualize road surface irregularities as shown in FIG. 3(b), the road surface is calibrated as a reference plane and patterns are projected, as shown in FIG. 6, on the road surface from the vehicle-mounted projectors P1 and P2, a convex part a is observed as red, a concave part b is observed as green, and the road surface c is observed as yellow, i.e. an intermediate color. This enables presentation of the road surface shape based on color information, so that highlighted presentation for drivers of road surface shapes can be realized.

A method of visualizing, as described above, three-dimensional distances relative to a reference plane will be described in detail below. First, how to calibrate images projected from first and second projectors P1 and P2 will be described. When calibrating images projected from the projectors P1 and P2, a camera C1 is used.

Figure 7:
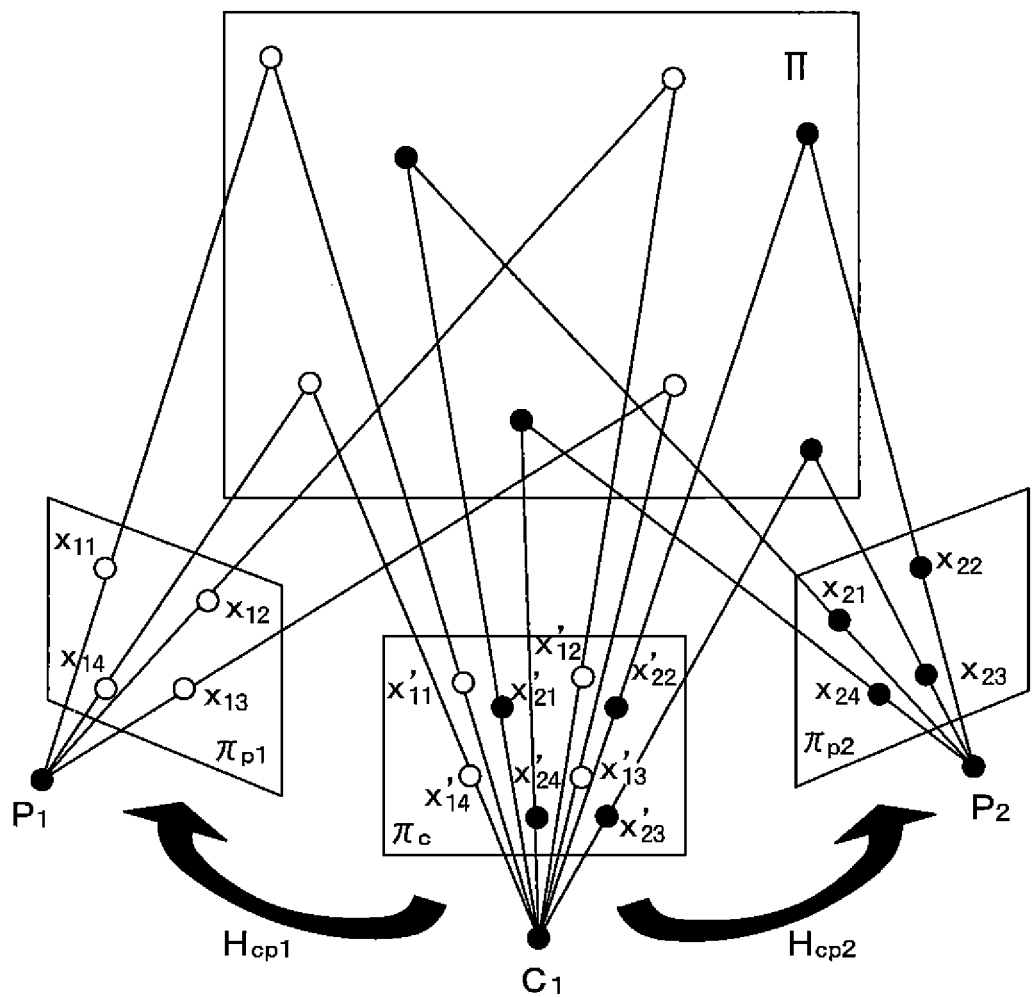
FIG. 7 is a diagram for explaining planar projective transform calculation.

Assume that a spatial reference plane Π, a camera C1, and projectors P1 and P2 are arranged as shown in FIG. 7. In this arrangement, a planar projective transform Hcp1 via the plane Π is present between an image plane πp1 of the projector P1 and an image plane πc of the camera C1. Similarly, a planar projective transform Hcp2 is present between πc and πp2. These planar projective transforms can be calculated using four corresponding sets of points.

Four points $x1i=[x1i, y1i, 1]^T$ (i=1, ..., 4) and four points $x2i=[x2i, y2i, 1]^T$ (i=1, ..., 4) are projected from the projectors P1 and P2, respectively, on the reference plane Π. The point coordinates are represented using homogenous coordinates, and T indicates transposition. Based on an image of these points $x'1i=[x'1i, y'1i, 1]^T$, $x'2i[x'2i, y'2i, 1]^T$ (i=1, ..., 4) taken by the camera C1, 3×3 planar projective transform matrices Hcp1 and Hcp2 meeting equations 1 and 2 are obtained.

[Equation 1]

$$x_{1i} \sim H_{cp1} x'_{1i} (i=1, \ldots, 4) \quad (1)$$

[Equation 2]

$$x_{2i} \sim H_{cp2} x'_{2i} (i=1, \ldots, 4) \quad (2)$$

Symbol ~ used in equations 1 and 2 means "equal up to a scale factor." The planar projective transform matrices Hcp1 and Hcp2 can be calculated linearly as follows. Now, to consider calculating Hcp1, consider vector h of nine vertically arranged elements of 3×3 matrix Hcp1 (see Equation 3).

[Equation 3]

$$h = [h_{11} h_{12} h_{13} h_{21} h_{22} h_{23} h_{31} h_{32} h_{33}]^T \quad (3)$$

Hij is the element of row i and column j of Hcp1. The following linear equation (see Equation 4) can be obtained by developing and rearranging the projective transform equation, Equation 1.

[Equation 4]

$$Mh = 0 \quad (4)$$

where 0 represents a zero vector and M represents the following 8×9 matrix (see Equation 5).

[Equation 5]

$$M = \begin{bmatrix} x'_{11} & y'_{11} & 1 & 0 & 0 & 0 & -x'_{11}x_{11} & -y'_{11}x_{11} & x_{11} \\ 0 & 0 & 0 & x'_{11} & y'_{11} & 1 & -x'_{11}x_{11} & -y'_{11}y_{11} & y_{11} \\ x'_{12} & y'_{12} & 1 & 0 & 0 & 0 & -x'_{12}x_{12} & -y'_{12}x_{12} & x_{12} \\ 0 & 0 & 0 & x'_{12} & y'_{12} & 1 & -x'_{12}y_{12} & -y'_{12}y_{12} & y_{12} \\ x'_{13} & y'_{13} & 1 & 0 & 0 & 0 & -x'_{13}x_{13} & -y'_{13}x_{13} & x_{13} \\ 0 & 0 & 0 & x'_{13} & y'_{13} & 1 & -x'_{13}y_{13} & -y'_{13}y_{13} & y_{13} \\ x'_{14} & y'_{14} & 1 & 0 & 0 & 0 & -x'_{14}x_{14} & -y'_{14}x_{14} & x_{14} \\ 0 & 0 & 0 & x'_{14} & y'_{14} & 1 & -x'_{14}y_{14} & -y'_{14}y_{14} & y_{14} \end{bmatrix} \quad (5)$$

The contents of matrix M are coordinate values of points on the projector and camera images, so that they are known values. Therefore, by solving the linear equation shown as Equation 4, vector h can be obtained and the projective transform matrix Hcp1 can be obtained. Solution h of Equation 4 is obtained as an eigenvector corresponding to the minimum eigenvalue of the matrix $M^T M$. Hcp2 can also be calculated in a similar manner.

As described above, the projective transform can be obtained using a minimum of four corresponding sets of points. When as many as N corresponding sets of points are present with N being 5 or more, the projective transform can be obtained in a stabler manner by using all of the N corresponding sets of points. In this case, the matrix M becomes a 2N×9 matrix, and solution h can be obtained as an eigenvector corresponding to the minimum eigenvalue of the matrix $M^T M$.

Using the planar projective transforms Hcp1 and Hcp2 obtained as described above makes it possible to project, from each projector, an arbitrary image on the reference plane Π.

The gradation patterns for the two projectors P1 and P2 are generated such that the luminance value resulting from adding up the light emitted from the two projectors P1 and P2 is constant on the reference plane Π. For this, two gradation images I1 and I2 (corresponding to FIGS. 2(a) and (b)) with luminance changing in opposing directions as shown in FIG. 2 are generated. To allow the camera C1 to take the gradation images I1 and I2, the gradation image I1 is transformed using the planar projective transform Hcp1 and the gradation image I2 is transformed using the planar projective transform Hcp2. The first and second projectors P1 and P2 are set to project the two transformed gradation images, referred to as I1' and I2', thus generated.

When the gradation images I1' and I2' are projected from the first and second projectors P1 and P2, respectively, the luminance of the two projected gradation images merged changes with the distance from the reference plane Π, so that the luminance value observed changes. This makes it possible to visualize and display distances from the reference plane Π. The reference plane Π can be arbitrarily set in three-dimensional space. When, for example, the reference plane Π is set perpendicular to the direction of vehicle travel as shown in FIG. 3(a), the luminance can be changed according to distances forward of the vehicle. When the reference plane is set, as shown in FIG. 3(b), on the road surface, the luminance can be changed according to road surface irregularities.

When projecting red-to-green color gradation images as shown in FIG. 5, planar projective transforms Hcp1 and Hcp2 are obtained in the same manner as described above and the color gradation images for projection from the projectors P1 and P2 are set using the planar projective transforms Hcp1 and Hcp2.

According to the present embodiment described above, three-dimensional information is presented directly on an object surface by merging light, thereby allowing information acquisition and information presentation to take place simultaneously_ This eliminates problems concerning coordinate system calibration to be performed when an existing system in which a measuring system and an information presentation system are separated is used and disparity between a real object and a display of the object observed in cases where indirect information presentation means such as a display monitor is used. Namely, unlike where the technique disclosed in non-patent literature 1 or 2 is used to perform three-dimensional measurement and three-dimensional information presentation separately, three-dimensional measurement and three-dimensional information presentation are completely unified, so that three-dimensional information can be visualized without requiring any three-dimensional information to be processed for restoration. Also, three-dimensional information is presented as changes in color or luminance directly on the surface of a target three-dimensional object without using any display device (display screen) such as a display monitor or HUD. Therefore, unlike where existing techniques are used, the user is not required to watch a display screen. Furthermore, positional errors on display and observer's focus shifting between real and displayed objects which may occur when an HUD is used do not occur at all.

Second Embodiment

In a second embodiment, presentation of a specific three-dimensional part is highlighted, even though, in the first embodiment described above, distances from the reference plane Π are highlighted. In other words, in the second embodiment, three-dimensional information not proportional to distance is presented.

Even though the present embodiment will be described below by way of an example in which a specific three-dimensional part is highlighted using three projectors, it is also possible to highlight a specific three-dimensional part using two projectors.

Figure 8:
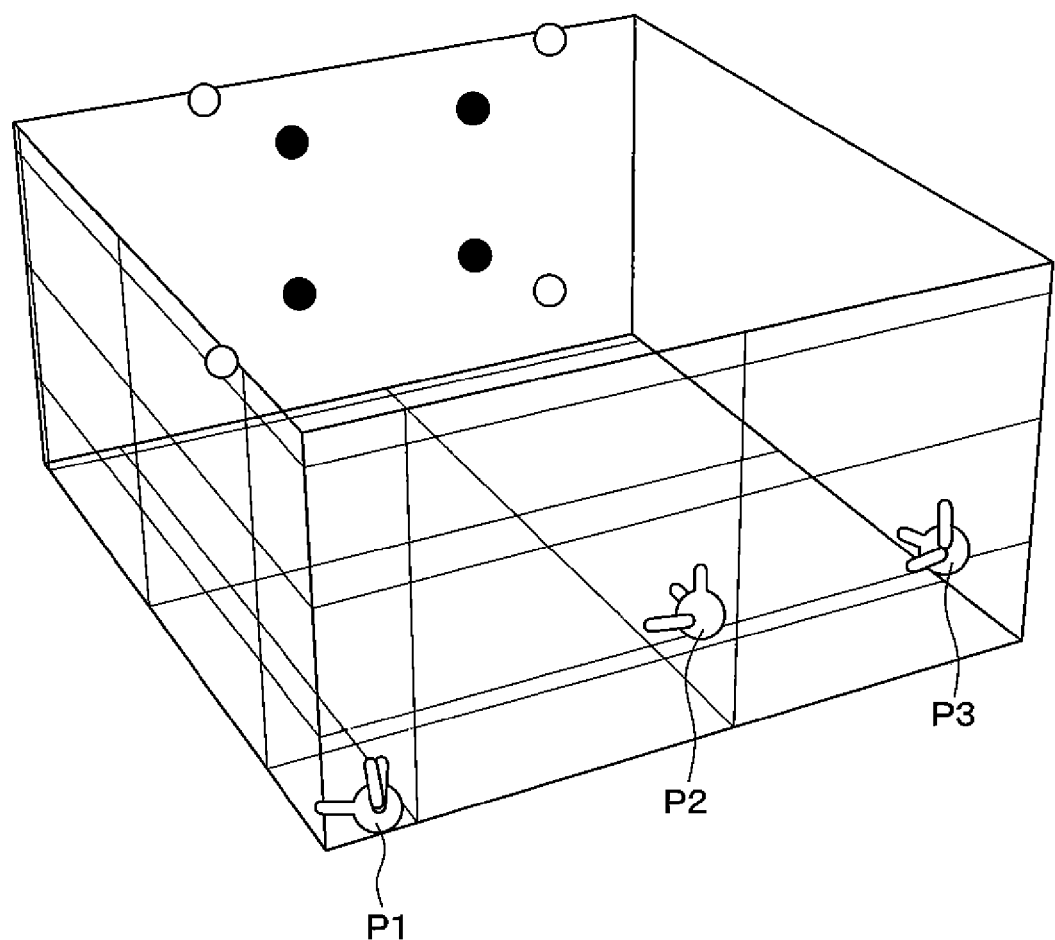
FIG. 8 is a diagram showing a configuration of a three-dimensional information presentation device according to a second embodiment of the present invention.
Figure 9:
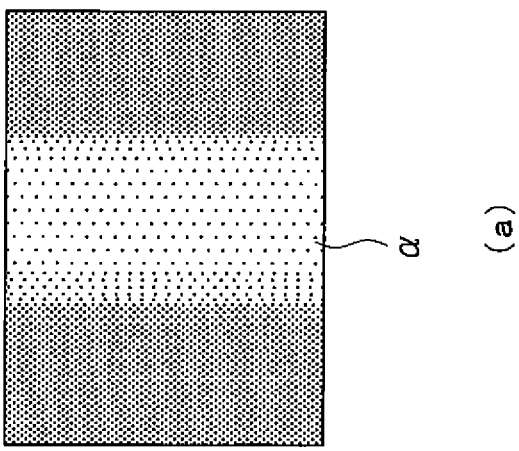
FIG. 9 is a diagram showing projection patterns of the three projectors shown in FIG. 8.
Figure 9:
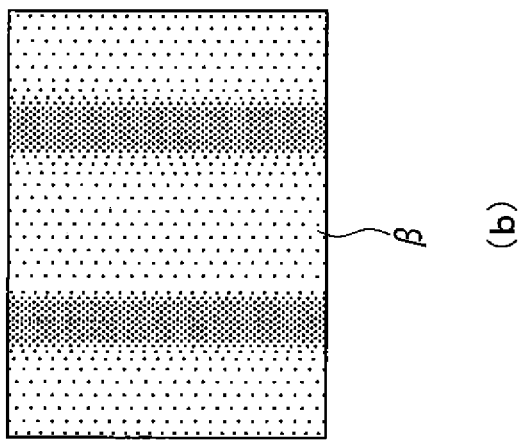
Figure 9:
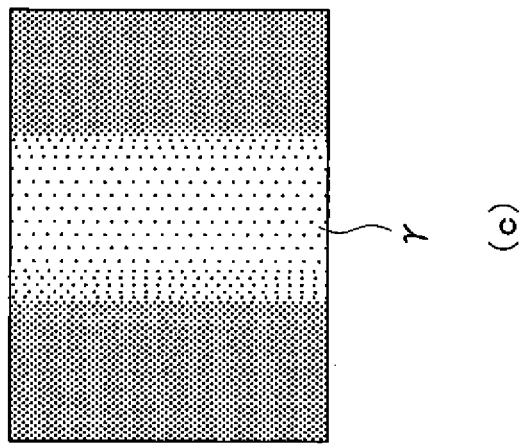
Figure 10:
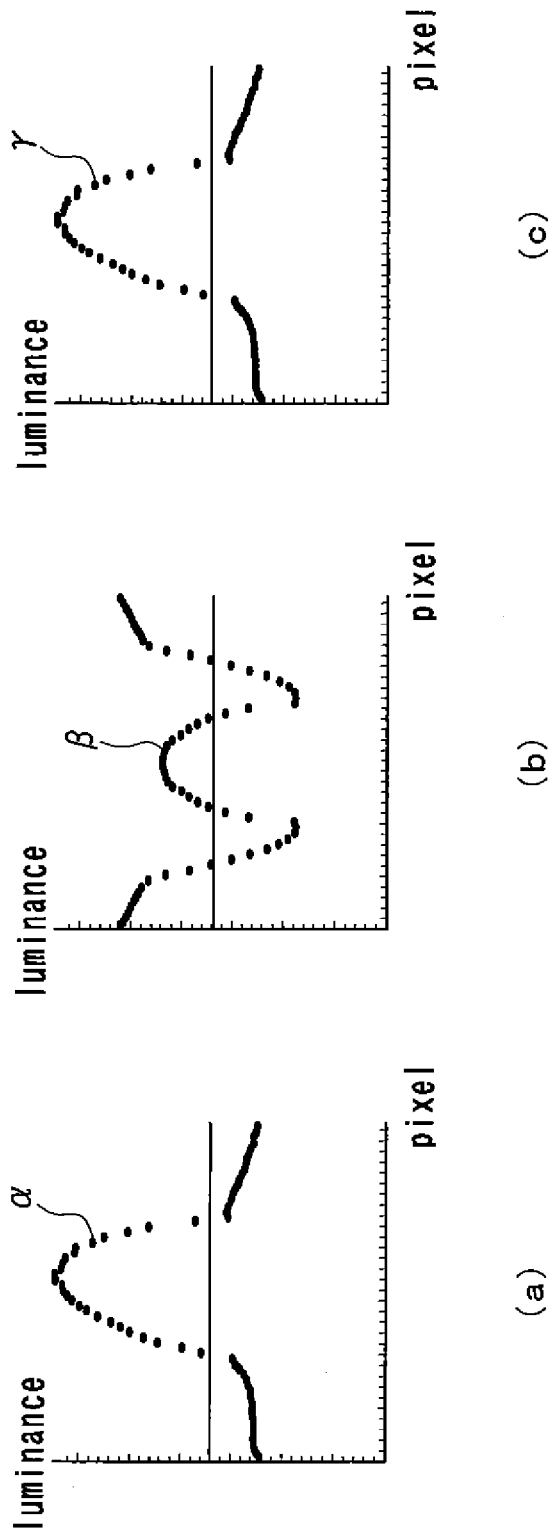
FIG. 10 is a diagram showing the projection patterns of the three projectors shown in FIG. 8.

In a three-dimensional information presentation device according to the present embodiment, the surface of a target object is irradiated with light from three projectors P1, P2, and P3 as shown in FIG. 8. The patterns, α, β, and γ, of light emitted from the three projectors P1, P2, and P3 are made to show non-linear gray-level gradations as shown in FIGS. 9 and 10.

Figure 11:
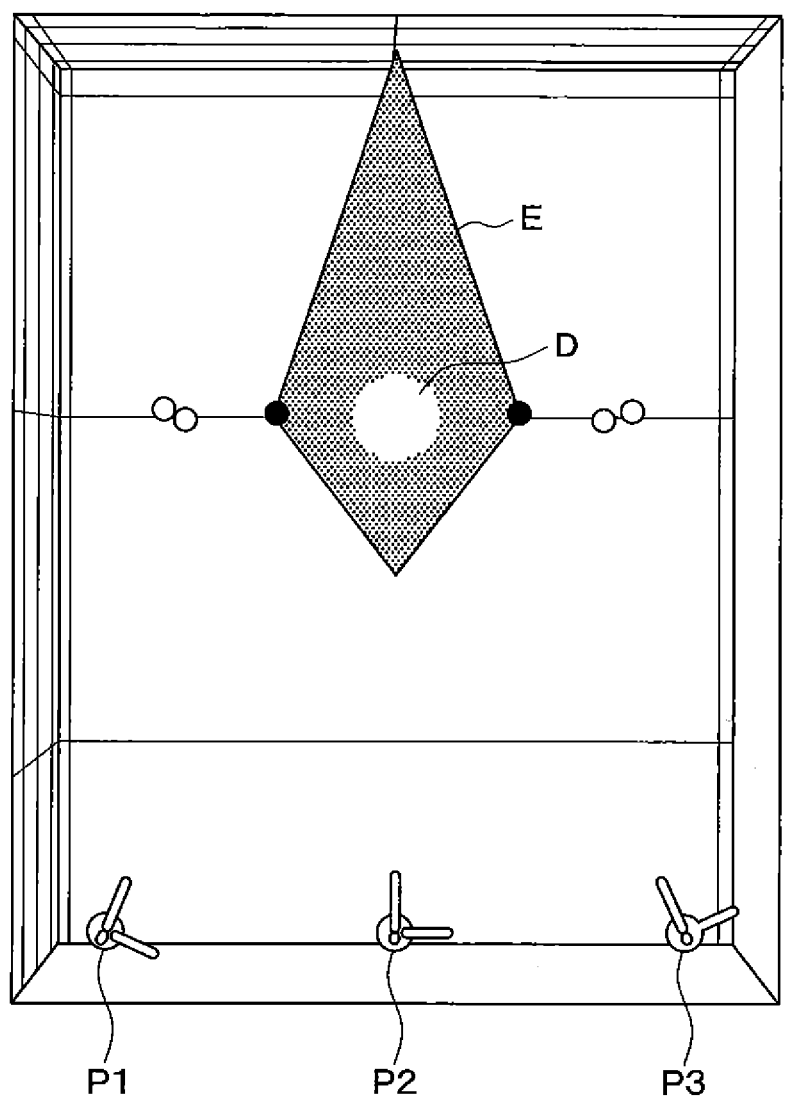
FIG. 11 is a diagram conceptually showing the luminance of a target object surface irradiated with light from the three-dimensional information presentation device shown in FIG. 8.

As a result, on the target object surface, a specific part D becomes higher in luminance than other parts as conceptually shown in FIG. 11. Thus, a specific three-dimensional part can be highlighted using luminance generated on the object surface. In FIG. 11, a part E is where light emitted from the three projectors P1, P2, and P3 overlaps.

Figure 12:
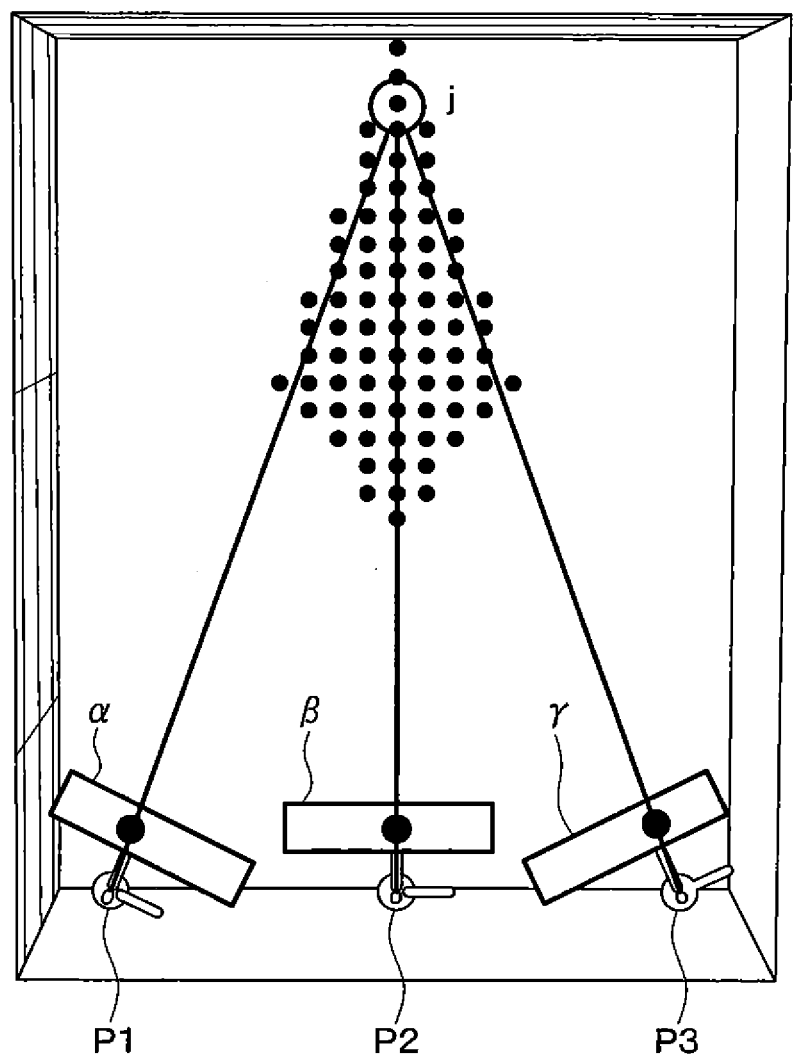
FIG. 12 is a diagram for explaining a method of projective pattern calculation made in the three-dimensional information presentation device shown in FIG. 8.

How a specific three-dimensional part can be highlighted as described above will be described in detail below. First, how to calculate projection patterns for highlighted presentation of a specific part will be described. Assume that projectors P1, P2, and P3 are spatially arranged as shown in FIG. 12. Color observed at an arbitrary point j on the object surface is expressed by the following linear equation (see Equation 6).

[Equation 6]

$$W_\alpha^j \alpha + W_\beta^j \beta + W_\gamma^j \gamma = I_j \quad (6)$$

In the above equation, $\alpha=[\alpha_1, \ldots, \alpha_N]^T$, $\beta=[\beta_1, \ldots, \beta_N]^T$, and $\gamma=[\gamma_1, \ldots, \gamma_N]^T$, are vectors representing the projection patterns of the respective projectors with the respective vectors composed of brightnesses $\alpha_i$, $\beta_i$ and $\gamma_i$ (i=1, ..., N) of N pixels each of the respective projectors. $W_\alpha^j=[W_{\alpha 1}^j, \ldots, W_{\alpha N}^j]$, $W_\beta^j=[W_{\beta 1}^j, \ldots, W_{\beta N}^j]$, and $W_\gamma^j=[W_{\gamma 1}^j, \ldots, W_{\gamma N}^j]$ are vectors respectively composed of the degrees of contribution, $W_{\alpha i}^j$, $W_{\beta i}^j$, and $W_{\gamma i}^j$ (i=1, ..., N), of the respective pixels of the respective projection patterns used to color a target spatial point j. The degree of contribution W assumes a value between 0 and 1 with 0 meaning that the pixel does not contribute to coloring of point j at all and 1 meaning that the pixel greatly contributes to coloring of point j. The degree of contribution of a pixel is determined according to the magnitude of overlapping of the light beam emitted from the pixel and the discrete point j.

Therefore, the colors observed, $I_1$ to $I_M$, at M discretized points on the target object surface are expressed by the following linear equation (see Equation 7).

[Equation 7]

$$\begin{bmatrix} W_\alpha^1 & W_\beta^1 & W_\gamma^1 \\ W_\alpha^2 & W_\beta^2 & W_\gamma^2 \\ \vdots & \vdots & \\ W_\alpha^M & W_\beta^M & W_\gamma^M \end{bmatrix} \begin{bmatrix} \alpha \\ \beta \\ \gamma \end{bmatrix} = \begin{bmatrix} I_1 \\ I_2 \\ \vdots \\ I_M \end{bmatrix} \quad (7)$$

In the above Equation 7, the M×3N matrix on the left hand side represents the degree of contribution (weight) of each pixel.

Equation 7 can be represented by Equation 8 shown below.

[Equation 8]

$$WY = I \quad (8)$$

where W is the M×3N matrix in Equation 7, Y is the vector representing the projection pattern of each projector, and I is the vector representing the color observed at each of M discretized points.

The contents of matrix W can be determined beforehand according to the magnitude of overlapping of the light beam emitted from each pixel and each point in the target space, so that they are all known. Vector I is set according to coloring to be made. Therefore, solving the linear equation, Equation 8, determines vector Y, i.e. the projection pattern of each projector.

The projection pattern of each projector thus determined may include negative luminance values, but negative light cannot be projected from any projector.

In the present embodiment, to solve the problem of such negative luminance values, light luminance is represented as described below. For example, when the colored image to be generated is as shown in FIG. 13(a) with luminance I having a value between 0 and 1, the value of luminance I of the part to be highlighted is set to 1 (I=1) whereas the value of luminance I of other parts is set to 0.5 (I=0.5).

Figure 13:
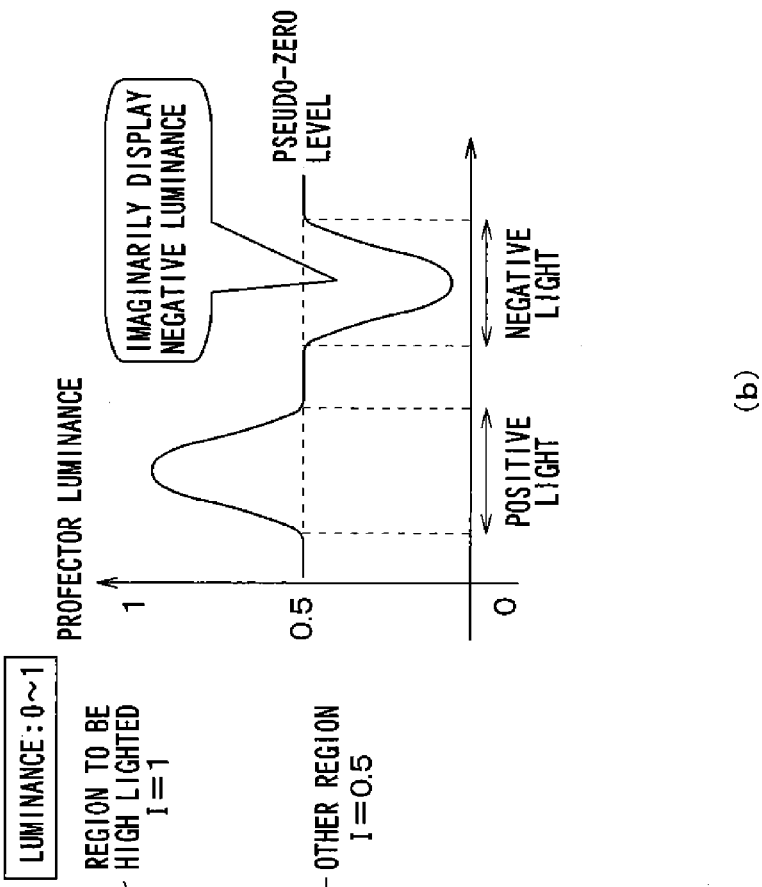
FIG. 13 is a diagram for explaining a method of luminance representation by the three-dimensional information presentation device shown in FIG. 8.
Figure 13:
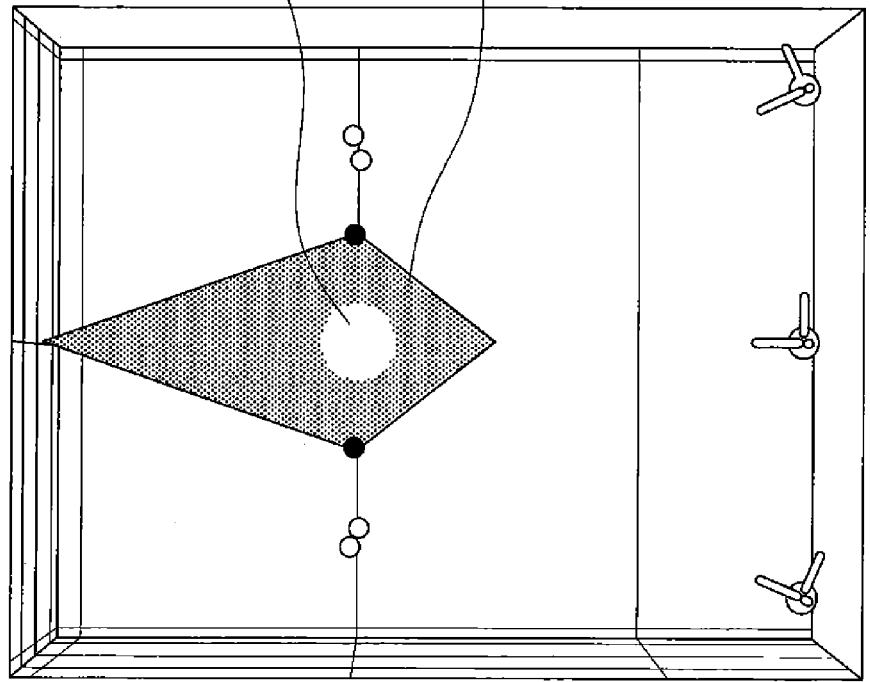

Namely, a negative luminance value (negative light) can be falsely represented by regarding luminance (projector light quantity) I=0.5 as a pseudo-zero level as shown in FIG. 13(b).

Figure 14:
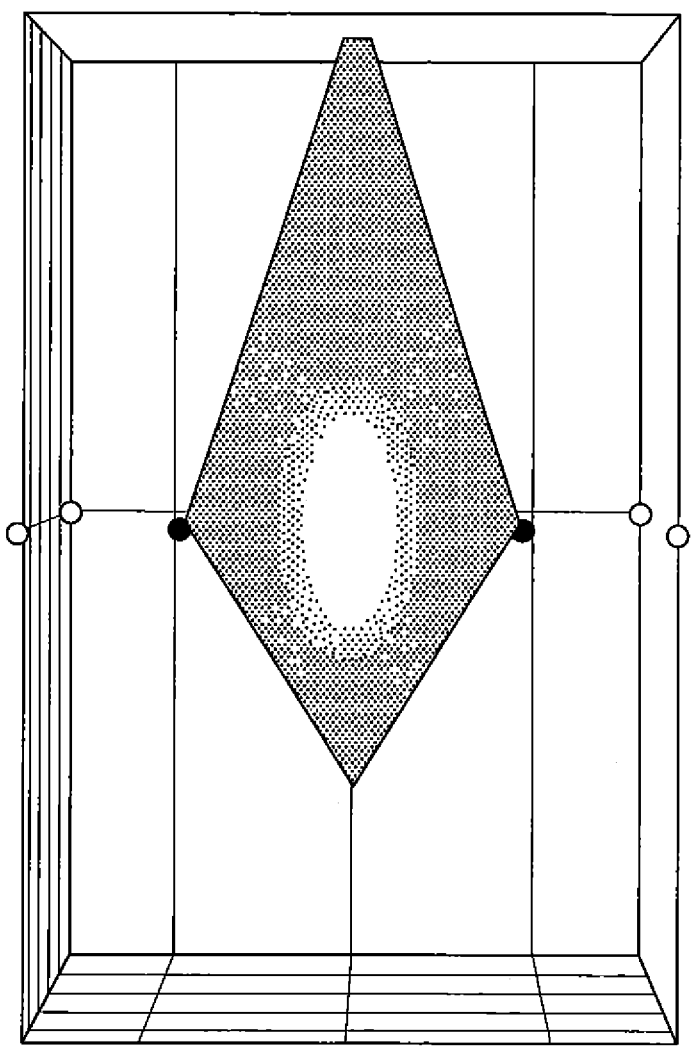
FIG. 14 is a diagram showing an example of projection result obtained by the three-dimensional information presentation device shown in FIG. 8.

When the projection patterns generated as described above are projected from the projectors P1, P2, and P3, the luminance of overlapping light beams changes between spots on the target object surface, so that different luminance values are observed on different spots of the target object surface. A projection result obtained in this way is shown in FIG. 14. Thus, with high luminance observed in a specific three-dimensional part, presentation of the specific three-dimensional part is highlighted.

Figure 15:
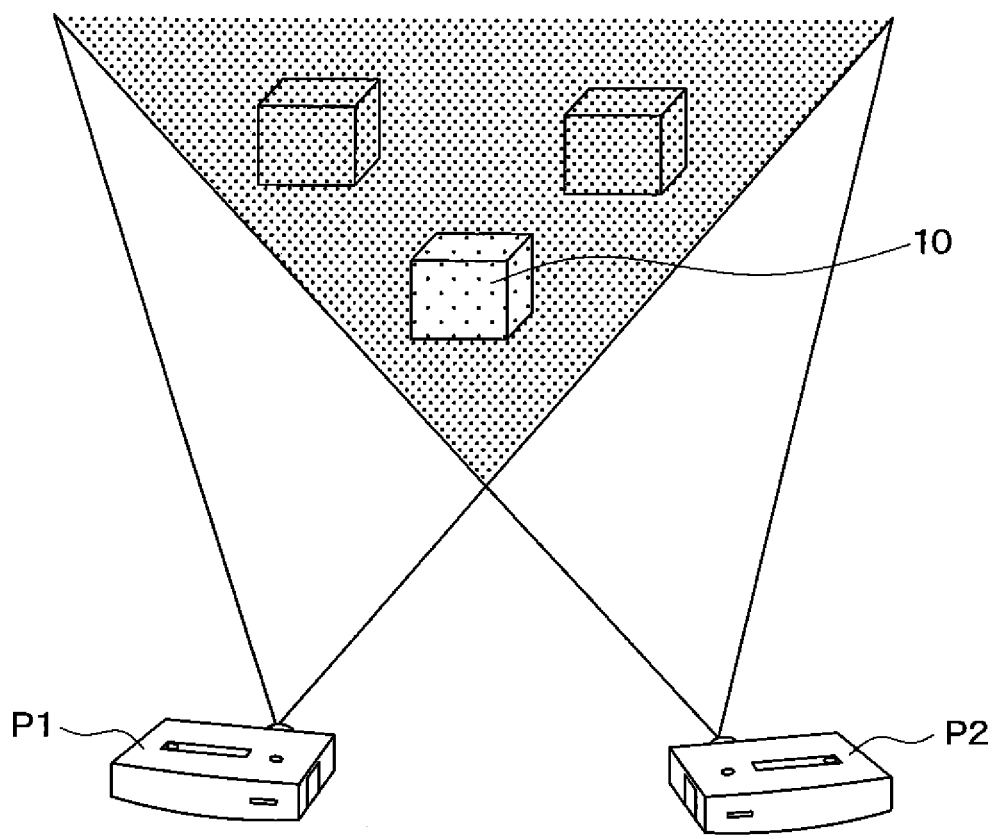
FIG. 15 is a diagram for explaining highlighted presentation of an obstacle effected using vehicle-mounted projectors.

For example, when the three-dimensional information presentation device is applied as vehicle-mounted projectors to a vehicle, an object 10 (which may be a vehicle or an obstacle) can be highlighted as shown in FIG. 15.

Figure 16:
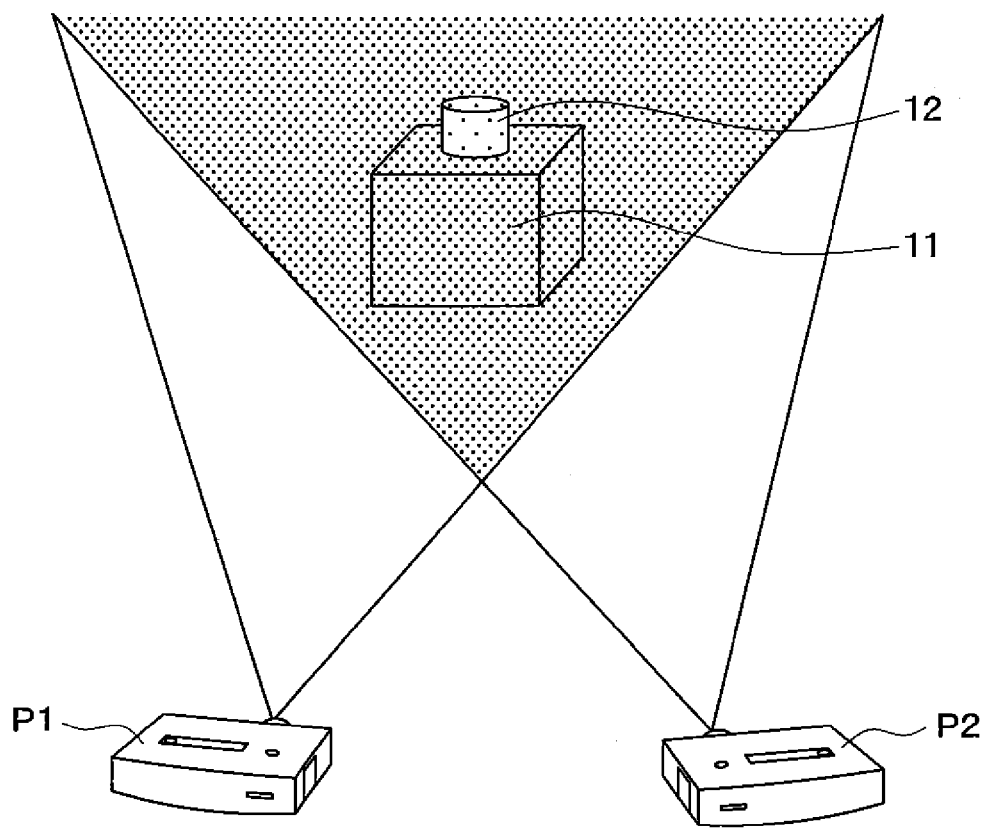
FIG. 16 is a diagram for explaining highlighted presentation of a defectively shaped part of a product effected using projectors applied to a product inspection device.

The three-dimensional information presentation device can be applied to a product inspection device. For example, as shown in FIG. 16, light beams are emitted to a product 11 from plural projectors P1, P2, and P3 so as to highlight three-dimensional parts other than the correctly shaped portion (the rectangular solid portion in the example shown in FIG. 16) of the product 11. In this way, a defectively shaped part 12 (the cylindrically shaped part in the example shown in FIG. 16) is highlighted making it easy to determine whether the product is defective or not.

Other Embodiments

The present invention is not limited to the above embodiments and can be modified as follows.

(1) When color-change gradation patterns are to be projected from projectors, mutually complementary colors may be used so that overlapping light looks white (colorless) on the reference plane whereas, on other than the reference plane, overlapping light looks colored.

(2) The coded pattern light projected from projectors need not be static pattern light, and it may be dynamic pattern light which changes temporally. Using temporally and spatially coded dynamic pattern light makes it possible to color and illuminate a moving object and change the color and brightness of the moving object according to its move. This makes it possible to highlight only an object engaged in specific movement.

Figure 17:
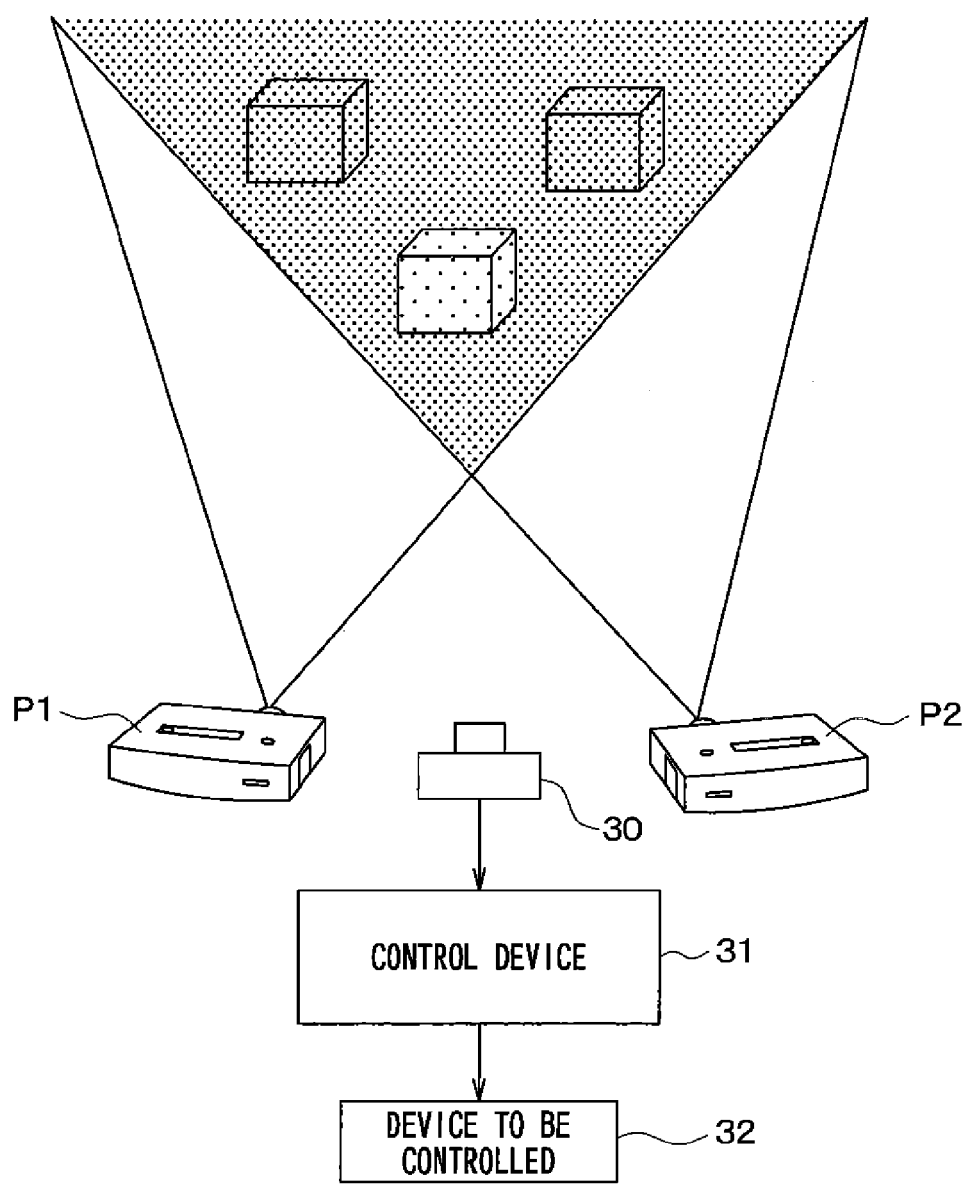
FIG. 17 is a block diagram showing a system configuration according to an embodiment in which a target device is controlled using presented three-dimensional information.

(3) The three-dimensional information presented may be, besides being perceived by users, acquired by three-dimensional information acquisition means for use in controlling various devices. For example, as shown in FIG. 17, the result of projection from projectors P1 and P2 may be shot by a camera 30 allowing the image shot to be inputted to a control device 31 used as three-dimensional information acquisition means and the control device 31 to perform various determination processing based on the inputted image and output, based on a determination result, a control signal to a device 32 to be controlled.

When, for example, the device 32 to be controlled is a vehicle collision alarm device, the control device 31 may determine whether any vehicle or obstacle is present forward of the user's vehicle and, if a vehicle or obstacle is determined to be present forward of the user's vehicle, output an alarm sound generation signal to the vehicle collision alarm device.

When, for example, the device 32 to be controlled is a product defect alarm, the control device 31 may determine whether a product has a defectively shaped part and, if the product is determined to have a defectively shaped part, output an alarm sound generation signal to the product defect alarm.

The coded pattern light (pattern light with spatially changing wavelength and intensity) projected from projectors need not be visible light. It may be invisible light. For example, referring to FIG. 17, infrared light may be projected as invisible light from the projectors P1 and P2 and the infrared light image (invisible image) taken using an infrared light camera as the camera 30 may be inputted to the control device 31.

(4) The projection means to be used need not be projectors like those shown in FIG. 1. The projection means may be composed of plural light emitting means (for example, LEDs). When vehicle-mounted projectors are to be used, projection means may be installed in the headlight devices provided on both sides of the vehicle front. Or, in cases each headlight includes plural light emitting means (for example, LEDs), part of the light emitting means may be used as projecting means for each vehicle-mounted projector.

(5) The number of projection means to be used need not be two. It may be three or more depending on the technique to be used. Increasing the number of projection means to be used enables highlighted presentation of more complicated non-linear three-dimensional information.

The invention that can be figured out from the above embodiments will be described below. The present invention provides a three-dimensional information presentation device which, according to a first aspect of the invention, includes a plurality of light projecting means for projecting light to a same spatial region. In the three-dimensional information presentation device, light patterns projected from the plurality of light projecting means are spatially coded so as to present three-dimensional information about a projected surface.

Expression "light patterns are spatially coded" used in describing the present invention means "light patterns are set to be, for example, as shown in FIG. 2 or FIG. 9 (patterns representing spatially changing light wavelength or intensity).

It is a second aspect of the present invention that, in the three-dimensional information presentation device according to the first aspect of the invention, the light patterns projected from the plurality of light projecting means are spatially coded so as to present a distance perpendicular to a spatially set reference plane set in three dimensional space.

It is a third aspect of the present invention that, in the three-dimensional information presentation device according to the second aspect of the invention, light projected from the plurality of light projecting means is visible light with visible light patterns projected from the plurality of light projecting means visualizing a distance perpendicular to the reference plane.

It is a fourth aspect of the present invention that, in the three-dimensional information presentation device according to the third aspect of the invention, the light patterns projected from the plurality of light projecting means are gradation patterns. It is a fifth aspect of the present invention that, in the three-dimensional information presentation device according to the fourth aspect of the invention, the gradation patterns each represent light gradation along a direction in which the plurality of light projecting means are arranged.

It is a sixth aspect of the present invention that, in the three-dimensional information presentation device according to the fifth aspect of the invention, the gradation patterns are set such that a luminance value of light obtained by adding up light projected from the plurality of light projecting means is constant on the reference plane.

It is a seventh aspect of the present invention that, in the three-dimensional information presentation device according to one of the third to sixth aspects of the invention, the light patterns projected from the plurality of light projecting means are coded according to gray level change.

It is an eighth aspect of the present invention that, in the three-dimensional information presentation device according to one of the third to sixth aspects of the invention, the light patterns projected from the plurality of light projecting means are coded according to color change.

It is a ninth aspect of the present invention that, in the three-dimensional information presentation device according to the eighth aspect of the invention, a color of a light pattern projected from one of the plurality of light projecting means is complementary to a color of a light pattern projected from another one of the plurality of light projecting means, causing light added up on the reference plane to be white and light added up on other than the reference plane to be colored.

It is a tenth aspect of the present invention that, in the three-dimensional information presentation device according to one of the third to ninth aspects of the invention, the plurality of light projecting means are installed in a vehicle and visualize, by projecting light to a spatial region forward of the vehicle, a distance to an object forward of the vehicle.

It is an eleventh aspect of the present invention that, in the three-dimensional information presentation device according to one of the third to ninth aspects of the invention, the plurality of light projecting means are installed in a vehicle and visualize, by projecting light to a spatial region forward of the vehicle, a height difference in a direction perpendicular to a road surface forward of the vehicle.

It is a twelfth aspect of the present invention that, in the three-dimensional information presentation device according to one of the tenth and eleventh aspects of the invention, the plurality of light projecting means are installed in a headlight device of a vehicle.

It is a thirteenth aspect of the present invention that, in the three-dimensional information presentation device according to one of the tenth and eleventh aspects of the invention, the plurality of light projecting means are configured as a part of a plurality of light emitting means included in a headlight of a vehicle.

It is a fourteenth aspect of the present invention that, in the three-dimensional information presentation device according to the second aspect of the invention, light projected from the plurality of light projecting means is invisible light with invisible light patterns projected from the plurality of light projecting means presenting a distance perpendicular to the reference plane.

It is a fifteenth aspect of the present invention that the three-dimensional information presentation device according to the fourteenth aspect of the invention further includes three-dimensional information acquisition means for acquiring three-dimensional information presented by invisible light projected from the plurality of light projecting means.

It is a sixteenth aspect of the present invention that, in the three-dimensional information presentation device according to the fifteenth aspect of the invention, the plurality of light projecting means are installed in a vehicle and visualize, by projecting invisible light to a spatial region forward of the vehicle, a distance to an object forward of the vehicle or a height difference in a direction perpendicular to a road surface forward of the vehicle.

It is a seventeenth aspect of the present invention that, in the three-dimensional information presentation device according to the first aspect of the invention, light patterns projected from the plurality of light projecting means are spatially coded so as to cause presentation of a specific three-dimensional region to be highlighted.

It is an eighteenth aspect of the present invention that, in the three-dimensional information presentation device according to the seventeenth aspect of the invention, the plurality of light projecting means are installed in a vehicle and project invisible light to a spatial region forward of the vehicle so as to cause an object in a specific region forward of the vehicle to be highlighted.

It is a nineteenth aspect of the present invention that, in the three-dimensional information presentation device according to the seventeenth aspect of the invention, the plurality of light projecting means projects light to a product so as to cause a defectively shaped part of the product to be highlighted.

From the above embodiments, the following three-dimensional information presentation device can be figured out. Namely, the three-dimensional information presentation device includes a plurality of light projecting means for projecting light to a same spatial region. The light projected from the plurality of light projecting means is spatially patterned and, by overlapping on an object present in the spatial region, generates a light pattern corresponding to three-dimensional information on the object.

REFERENCE SIGNS LIST

P1, P2 Projector (light projecting means)

The invention claimed is:

1. A three-dimensional information presentation device comprising a plurality of light projecting means for projecting light to a same spatial region, wherein light patterns projected from the plurality of light projecting means are spatially coded so as to present three-dimensional information about a projected surface,
wherein the light patterns projected from the plurality of light projecting means are spatially coded so as to present a distance perpendicular to a reference plane set in three dimensional space.

2. The three-dimensional information presentation device according to claim 1, wherein light projected from the plurality of light projecting means is visible light and visible light patterns projected from the plurality of light projecting means visualize a distance perpendicular to the reference plane.

3. The three-dimensional information presentation device according to claim 2, wherein the light patterns projected from the plurality of light projecting means are gradation patterns.

4. The three-dimensional information presentation device according to claim 3, wherein the gradation patterns each represent light gradation along a direction in which the plurality of light projecting means are arranged.

5. The three-dimensional information presentation device according to claim 4, wherein the gradation patterns are set such that a luminance value of light obtained by adding up light projected from the plurality of light projecting means is constant on the reference plane.

6. The three-dimensional information presentation device according to claim 2, wherein the light patterns projected from the plurality of light projecting means are coded according to gray level change.

7. The three-dimensional information presentation device according to claim 2, wherein the light patterns projected from the plurality of light projecting means are coded according to color change.

8. The three-dimensional information presentation device according to claim 7, wherein a color of a light pattern projected from one of the plurality of light projecting means is complementary to a color of a light pattern projected from another one of the plurality of light projecting means, causing light added up on the reference plane to be white and light added up on other than the reference plane to be colored.

9. The three-dimensional information presentation device according to claim 2, wherein the plurality of light projecting means are installed in a vehicle and visualize, by projecting light to a spatial region forward of the vehicle, a distance to an object forward of the vehicle.

10. The three-dimensional information presentation device according to claim 2, wherein the plurality of light projecting means are installed in a vehicle and visualize, by projecting light to a spatial region forward of the vehicle, a height difference in a direction perpendicular to a road surface forward of the vehicle.

11. The three-dimensional information presentation device according to claim 9, wherein the plurality of light projecting means are installed in a headlight device of a vehicle.

12. The three-dimensional information presentation device according to claim 9, wherein the plurality of light projecting means are configured as a part of a plurality of light emitting means included in a headlight of a vehicle.

13. The three-dimensional information presentation device according to claim 1, wherein light projected from the plurality of light projecting means is invisible light and invisible light patterns projected from the plurality of light projecting means present a distance perpendicular to the reference plane.

14. The three-dimensional information presentation device according to claim 13, further comprising three-dimensional information acquisition means for acquiring three-dimensional information presented by invisible light projected from the plurality of light projecting means.

15. The three-dimensional information presentation device according to claim 14, wherein the plurality of light projecting means are installed in a vehicle and visualize, by projecting invisible light to a spatial region forward of the vehicle, a distance to an object forward of the vehicle or a height difference in a direction perpendicular to a road surface forward of the vehicle.

* * * * *